United States Patent
Hodge et al.

[11] Patent Number: 5,772,253
[45] Date of Patent: Jun. 30, 1998

[54] PIPE REPAIR OR JOINTING COLLAR

[75] Inventors: Ian Stuart Hodge, Dukinfield, United Kingdom; Jens Sonderby Madsen, Svendborg, Denmark

[73] Assignee: AVK Manufacturing Limited, Cheshire, England

[21] Appl. No.: 719,273

[22] Filed: Sep. 24, 1996

[30] Foreign Application Priority Data

Mar. 5, 1996 [GB] United Kingdom ............... 9604697

[51] Int. Cl.⁶ .................................................. F16L 55/172
[52] U.S. Cl. ........................... 285/15; 285/373; 285/379
[58] Field of Search .............................. 285/373, 15, 379

[56] References Cited

U.S. PATENT DOCUMENTS

| | | | |
|---|---|---|---|
| 4,768,813 | 9/1988 | Timmons | 285/373 |
| 5,121,946 | 6/1992 | Jardine | 285/373 X |
| 5,295,716 | 3/1994 | Bridges | 285/373 X |
| 5,605,357 | 2/1997 | Bird | 285/373 X |

Primary Examiner—Dave W. Arola
Attorney, Agent, or Firm—Bergert & Bergert

[57] ABSTRACT

A pipe repair or jointing collar, comprising a pair or arcuate segments (10) with clamping means (at 11) for drawing the segments together along an axis (XX) to form a collar around a pipe or a plurality of pipe ends, each segment (10) having an associated sealing member comprising a pair of longitudinally-spaced arcuate sealing strips (21) between the respective ends of which extend a pair of longitudinal sealing strips (20) with wedge-like members (18) embedded therein adapted to progress generally inwardly each towards the axis (XX) with respect to the segments (10) as the latter are drawn together in order to force the sealing members (20, 21) radially inwards locally of the wedge-like members (18). The integral formation of the sealing members and wedge-like members provide a minimum number of parts to aid assembly of the collar in hazardous conditions.

12 Claims, 3 Drawing Sheets

PIPE REPAIR OR JOINTING COLLAR

THIS INVENTION concerns split collars for repairing and jointing pipes such as gas pipes and water pipes. Such collars may serve to repair a single damaged pipe, to form a joint between two aligned pipe ends, or to serve as a tee piece to join one pipe with another or others extending at an angle therefrom.

Repair or jointing collars for this purpose take many different forms. Usually they must be designed to correspond very closely with the outer diameter of the pipes thus to ensure a watertight or gas tight seal. Since the collars are designed to be fitted to existing underground mains some of which can be many years old, it is very difficult to ensure that it will always provide an adequate seal. Owing to changing standards, materials, manufacturing techniques and corrosion, pipes of the same nominal diameter can vary widely in actual diameter. Therefore, it is desired that such a collar should be able to accommodate wide variations and differences in pipe diameter.

One known form of repair collar designed for this purpose comprises a pair of arcuate segments whose abutting end faces are inclined with respect to a diammetral plane of the collar so that as the segments are drawn together the respective inclined faces undergo relative sliding movement thus squeezing the pipe at a plurality of positions around its circumferences. This requires sufficient resilience or flexibility in the material from which the segments are made so that they may be deformed inwardly to define a smaller radius. However since this kind of arrangement does not ensure a uniform reduction throughout the circumference, certain zones remain in which adequate sealing cannot be assured.

A further known form of repair collar designed to overcome the aforementioned difficulty is described and claimed in patent specification GB 2189000 in which there is provided a collar comprising a pair of arcuate segments with clamping means for drawing the segments together around the pipe, with interposition of one or more corresponding elastomeric arcuate sealing means, and characterised by wedge-like members located between the segments and the sealing means in the region of the clamping means so that the wedge-like members are adapted to slide generally inwardly with respect to the segments as the latter are drawn together thus to force the sealing means radially inwards in those regions.

One disadvantage experienced in the use of collars of this latter kind is that accurate assembly of the segments, the sealing means and the wedge-like members, sometimes presents practical difficulties, particularly since such collars must be assembled on site and sometimes in a very hostile environment. Thus, accuracy of assembly cannot always be guaranteed, and the integrity of a seal provided by the collar is heavily reliant upon accurate assembly and tightening of the separate parts of the collar.

The present invention seeks to avoid these difficulties at least to a considerable extent.

According to the present invention a pipe repair or jointing collar comprises a plurality of arcuate segments with clamping means for drawing the segments together to form the collar around a pipe or around a plurality of pipe ends, with interposition of corresponding deformable sealing means, each arcuate segment having an associated sealing member, each sealing member comprising a pair of longitudinally spaced arcuate sealing strips between the respective ends of which extend a pair of longitudinal sealing strips, rigid wedge-like members being provided within the segments in the regions of the clamping means and adapted to progress generally inwardly with respect to the segments as the latter are drawn together thus to force the sealing members radially inwards in said regions; characterised in that the wedge-like members are non-removably formed with the sealing members.

Preferably, the wedge-like members are embedded within the longitudinal sealing strips which are integrally formed with the arcuate sealing strips thus to form a one-piece sealing means of rectangular form when laid flat.

Still further, the longitudinal sealing strips include at their respect ends a pair of integral lugs each having means for engagement with a part of a respective arcuate segment whereby each sealing means may be pre-assembled with its respective arcuate segment prior to assembly of the collar.

In one embodiment the collar comprises a pair of arcuate segments and a pair of sealing means each associated with one of the segments, the longitudinal sealing strips of the pair of sealing means having mutually abutting flat faces, the arcuate sealing strips extending to lie co-planar with said flat faces.

Also in a preferred embodiment there is provided at each corner defined by a respective arcuate sealing strip and longitudinal sealing strip a generally triangular strengthening web integrally formed with the arcuate and longitudinal sealing strips.

It is further preferred that the inner arcuate faces of the arcuate sealing strips are curved about an axis transverse to the longitudinal sealing strips.

An embodiment of the invention will now be described with reference to the accompanying drawings, in which.

Figure 2:
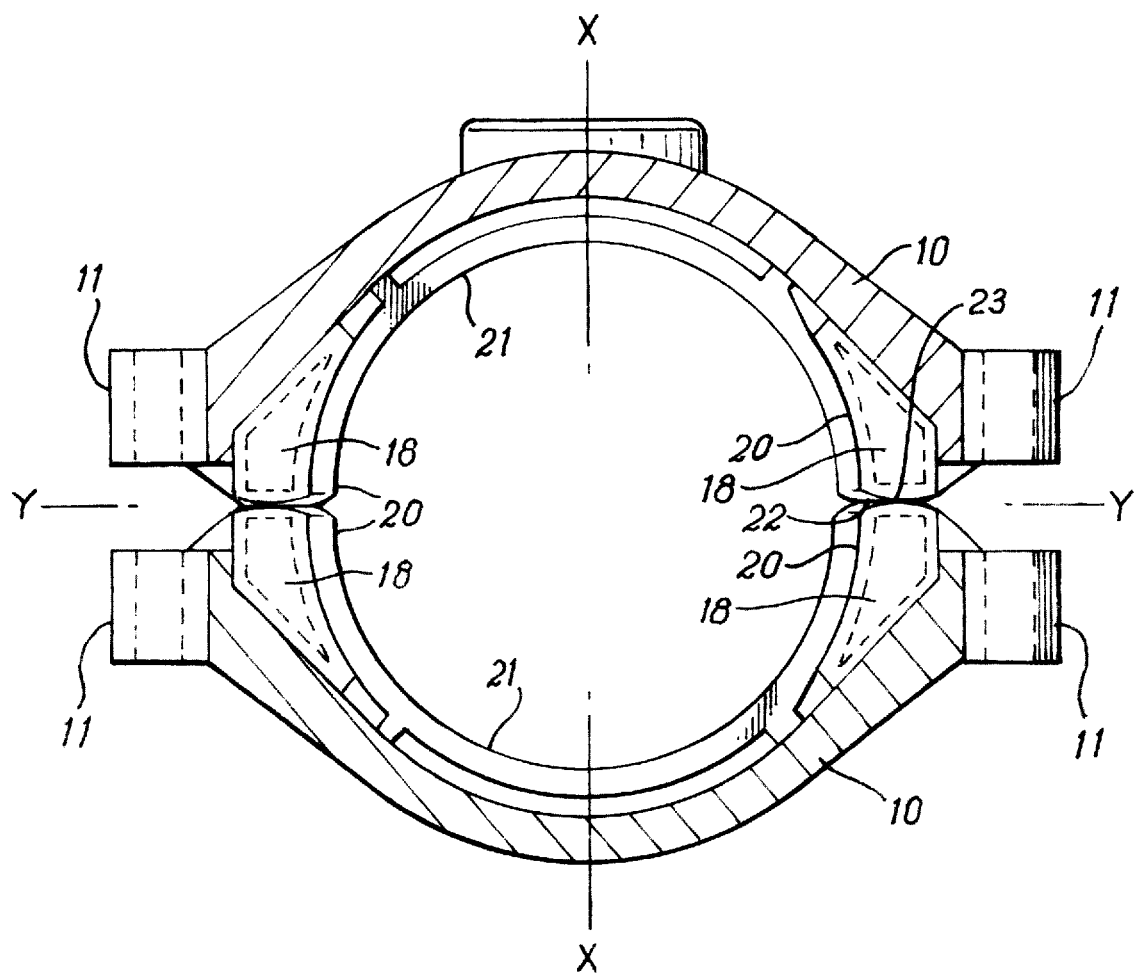
FIG. 2 is a vertical cross-section through a pipe repair or jointing collar made in accordance with the invention, as if taken along line II—II of FIG. 1.
Figure 3:
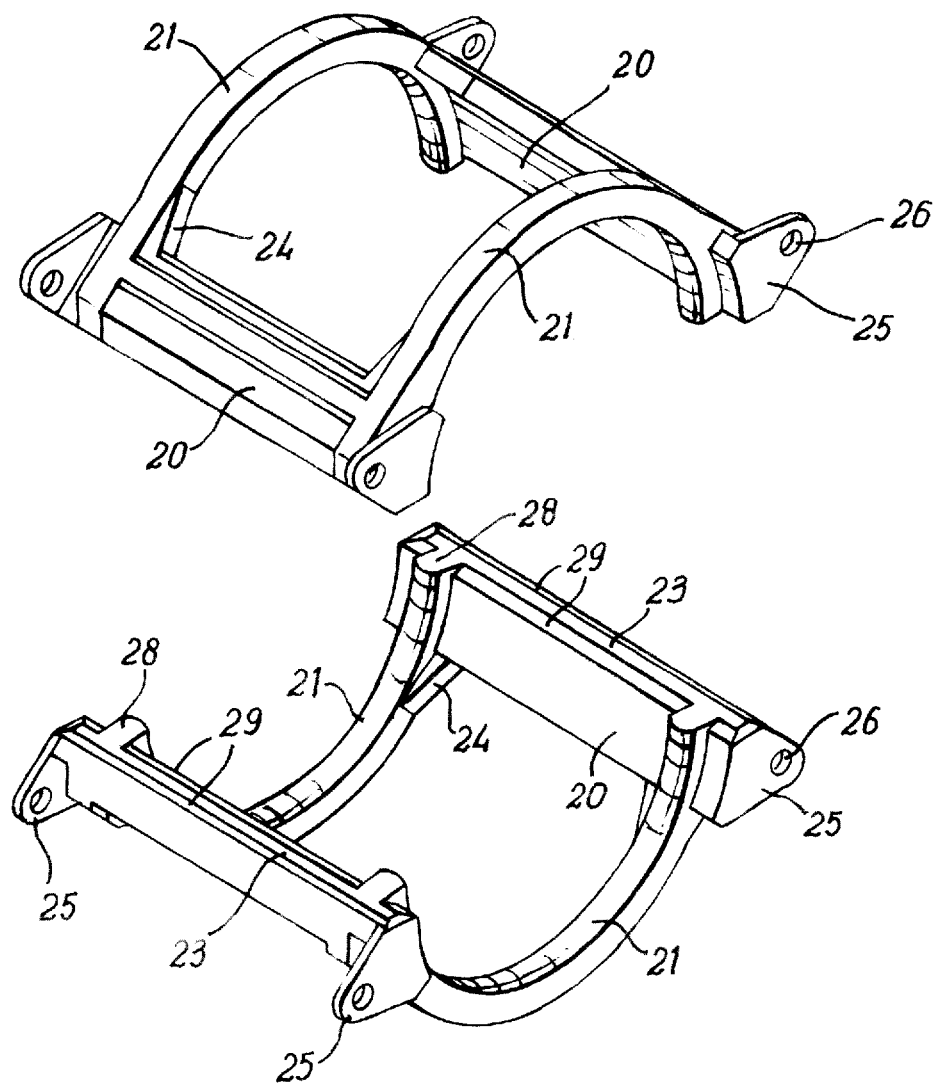

and FIG. 3 is an exploded view of a pair of sealing means being part of the collar illustrated in FIG. 2.

Figure 1:
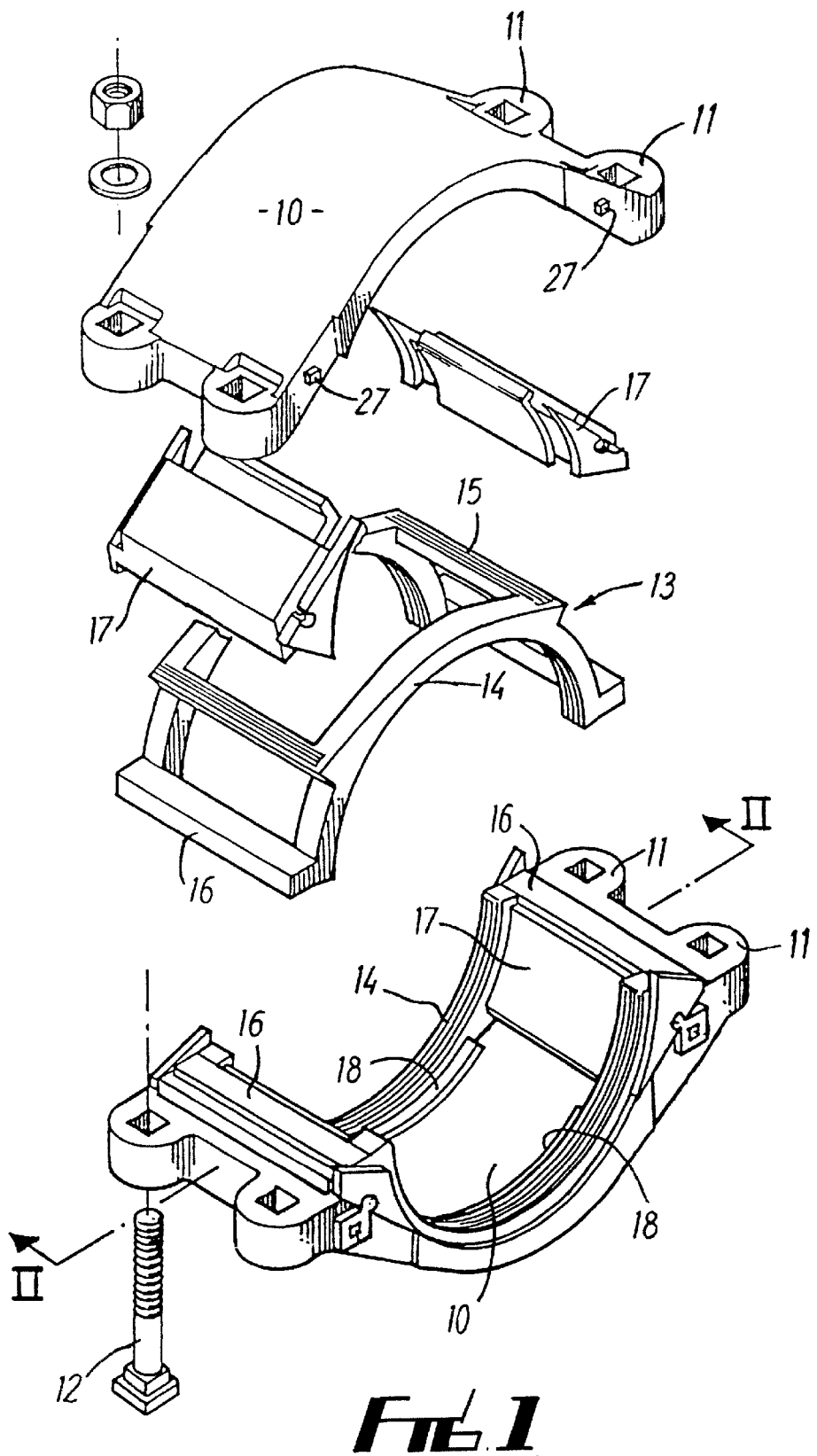
FIG. 1 illustrates a pipe repair or jointing collar of the kind previously described in GB 2189000.

Referring now to FIG. 1, the collar illustrated therein includes a pair of generally semi-cylindrical segments 10 of cast iron or a similar rigid material. Each segment 10 has at each end thereof a pair of radially directed bolt-receiving lugs 11 for drawing the segments together by means of bolts 12.

Each segment 10 receives an elastomeric sealing member generally indicated at 13 and consisting of circumferentially ribbed sealing strips 14 and longitudinally ribbed sealing strips 15 and 16. Each strip 16 serves to join adjacent ends of the circumferential strips 14 whilst each strip 15 also extends between the latter but at a circumferential position spaced from their ends. Adjacent each pair of radial lugs 11 and disposed between the body of the segment in this region and the adjacent part of the sealing member 13 is a separate sliding wedge-like member 17. As can be seen from the lower part of FIG. 1, each wedge 13 is retained in position on its associated segment 10 by means of the arcuate sealing strips 14 and the longitudinal sealing strips 15 and 16 with the strips located in respective channels in the wedge.

Internally protruding ribs 18 integral with the segments 10 serve to prevent longitudinal movement of the sealing members 13 and wedges 17.

Each wedge 17 slidingly abuts a generally tangential inner face of the associated segment 10. By this means, as the segments are drawn together by bolts 12, after initial contact of the adjacent faces of the respective sealing strips, further closure of the segments 10 will cause the wedges 17 to slide generally inwardly with a component of circumferential movement with respect to the adjacent segment surfaces thus to force the sealing members radially inwards in the regions of the radial lugs 11. Thus, there is substantially uniform reduction in the diameter of the sealing strips around the circumference of the pipe to ensure a good seal thereon substantially without deformation of the segments themselves.

For example, on a nominal 150 mm diameter pipe the range of actual diameters which may be accommodated whilst providing an effective seal is at least 20 mm.

Referring now to FIG. 2 and in accordance with the present invention, wedge-like inserts 18 of cast iron or aluminium are embedded within and thus formed integrally with the longitudinal sealing strips 20 which are themselves formed integrally with arcuate sealing strips 21 in such a manner that the inner sealing surfaces of the arcuate sealing strips 21 extend upwardly to a flat surface 22 co-planar with a flat surface 23 extending along each longitudinal sealing strip 20.

It can be seen from FIG. 2 that as the segments 10 are drawn together along the axis XX then the wedge-like inserts 18 embedded within the longitudinal sealing strips 20 will tend to move along the adjacent tangential surfaces of the segments, in each case towards the XX axis thereby forcing the arcuate sealing strips inwardly along an axis YY in the region of the radial lugs 11, i.e. where the clamping action on the segments is applied. This inwardly directed sealing effect ensures a uniform circumferential seal without deforming the segments themselves.

Referring now to FIG. 3 each sealing member can be seen in greater detail as consisting of the longitudinal sealing strips 20 and the arcuate sealing strips 21. The entire sealing member is integrally formed from a resilient material such as natural or synthetic rubber and, when each member is laid flat it is of rectangular form having, at each corner a triangular strengthening web 24, again integrally formed with the arcuate and longitudinal sealing strips.

Extending outwardly in a direction generally radially with respect to the assembled collar is an integral lug 25 having an aperture 26 therein for engagement upon abutments such as are illustrated in FIG. 1 at 27 on the segments 10. Thus, each sealing member may be pre-assembled with its respective segment, no further separate parts being required during final assembly when the two preassembled segments with sealing means thereon are brought together and clamped by bolts 12.

Unlike the arcuate sealing strips 14 of FIG. 1, those made in accordance with the invention and illustrated at 21 in FIGS. 2 and 3 have smooth inner sealing surfaces which, however, are slightly curved about their respective arcuate axes i.e. in the longitudinal direction of the collar. Similarly, the flat surfaces 23 of the longitudinal sealing strips 20 which are co-planar with similar flat faces 28 at the adjacent ends of the associated arcuate sealing strips 21, are surrounded by slightly inclined surfaces 29 extending inwardly from the outer edges of each longitudinal strip 20.

By extending the arcuate sealing strips right up to the sealing faces of the longitudinal strips integrity of the arcuate sealing strips is ensured.

It is not intended to limit the invention to the details described herein. For example, the embedded wedge-like inserts can be omitted in certain applications wherein the shape of the longitudinal sealing strips and the material thereof is selected such that they serve as wedge-like members to achieve an adequate seal.

We claim:

1. A pipe repair or jointing collar comprising a plurality of arcuate segments with clamping means for drawing the segments together to form the collar around a pipe or around a plurality of pipe ends, with interposition of corresponding deformable sealing means, each arcuate segment having an associated sealing member, each sealing member comprising a pair of longitudinally spaced arcuate sealing strips between the respective ends of which extend a pair of longitudinal sealing strips, rigid wedge-like members being provided within the segments in the regions of the clamping means and adapted to progress generally inwardly with respect to the segments as the latter are drawn together thus to force the sealing members radially inwards in said regions; characterised in that the wedge-like members are non-removably embedded within the sealing members and in that lugs are formed integrally with the sealing members with means on the lugs engaging a part of a respective arcuate segment during assembly of the collar.

2. A pipe repair or jointing collar according to claim 1, wherein the wedge-like members are embedded within the longitudinal sealing strips which are integrally formed with the arcuate sealing strips thus to form a one-piece sealing means of rectangular form when laid flat.

3. A pipe repair or jointing collar according to claim 2, wherein there is provided at each corner defined by a respective arcuate sealing strip and a longitudinal sealing strip a generally triangular strengthening web integrally formed with the arcuate and longitudinal sealing strips.

4. A pipe repair or jointing collar according to claim 1 or claim 2 wherein the integrally formed lugs are provided at the respective ends of the longitudinal sealing strips, each lug having means for engagement with a part of a respective arcuate segment.

5. A pipe repair or jointing collar according to claim 1, comprising a pair of said arcuate segments and a pair of said sealing means each associated with one of the segments, the longitudinal sealing strips of the pair of sealing means having mutually abutting flat faces, the arcuate sealing strips extending to lie co-planar with said flat faces.

6. A pipe repair or jointing collar according to claim 1, wherein the arcuate sealing strips are curved about an axis transverse to the longitudinal sealing strips.

7. A pipe repair or jointing collar according to claim 1, wherein the wedge-like members are of cast iron.

8. A pipe repair or jointing collar according to claim 1, wherein the wedge-like members are of aluminium.

9. A pipe repair or jointing collar according to claim 1, wherein each sealing member comprising the arcuate sealing strips and the longitudinal sealing strips, is formed as one piece integrally of natural or synthetic rubber.

10. A pipe repair or jointing collar, according to claim 1, wherein each arcuate sealing strip has a smooth inner sealing surface.

11. A pipe repair or jointing collar according to claim 1, wherein each longitudinal sealing strip is surrounded by slightly inclined surfaces extending inwardly from the outer edges thereof.

12. A pipe repair or jointing collar according to claim 1, wherein the shape of each longitudinal sealing strip, and the material thereof is selected such that the longitudinal sealing strips themselves serve as wedge-like members.

* * * * *